United States Patent Office 3,528,942
Patented Sept. 15, 1970

3,528,942
METHOD OF CROSS-LINKING AMORPHOUS POLYMERS AND COPOLYMERS OF α-OLEFINS AND THE RESULTANT PRODUCTS
Friedrich Wollrab and Maurice Gerkens, Brussels, Belgium, assignors to Solvay & Cie, Brussels, Belgium, a corporation of Belgium
No Drawing. Filed Apr. 7, 1967, Ser. No. 629,074
Claims priority, application Belgium, Apr. 14, 1966, 26,736, Patent 679,482
Int. Cl. C08f 45/04, 15/04
U.S. Cl. 260—41
22 Claims

ABSTRACT OF THE DISCLOSURE

Amorphous polymers and copolymers of α-olefins are cross-linked by being heated with a compound which forms free radicals at the heating temperature and dibenzalacetone or a substitution derivative thereof.

BACKGROUND OF THE INVENTION

The present invention relates to a method of cross-linking amorphous polymers of copolymers, conveniently generically referred to as "polymers," of α-olefins, more particularly ethylene-propylene copolymers, by heating to a high temperature a composition containing the polymer or copolymer, a cross-linking agent constituted of a compound able to form free radicals at the heating temperature, and a cross-linking coagent. The composition may in addition contain a mineral reinforcing material.

It is known to vulcanize ethylene-propylene copolymers by mixing them with an organic peroxide and sulphur by kneading, and then maintaining the mixture at high temperature, for example by means of a heated press. The vulcanizates produced by this method have interesting mechanical properties; their elongation modulus, at 300%, attains a fairly high but not excessive value, elongation at break is likewise fairly considerable, and finally the ultimate tensile strength is very high. According to a recent theory (Journal of Polymer Science, part A, vol. 2, p. 3063–1964), these extremely favorable properties are attributed to the formation between the copolymer chains of cross-links capable of rearrangement when the cross-linked product is subjected to a mechanical stress.

Despite the interesting mechanical properties which it imparts, sulphur is not capable of generalized use for the hardening of ethylene-propylene copolymers. Indeed, the presence of sulphur in the vulcanizates entails the often unacceptable disadvantage of imparting to them a very pronounced and very disagreeable odor. Moreover, these vulcanizates cannot be placed directly in contact with metals, because the sulphur promotes their corrosion by acting as an electron acceptor. In practice this excludes sulphur vulcanizates from a use for which they would appear to be particularly indicated, namely the coating of metals and particularly the insulation of electric cables, because the use of an intermediate protective layer would unduly increase the cost of and complicate the coating process.

For the cross-linking of elastomers it has been attempted to replace sulphur by compounds the molecules of which contains a plurality of unsaturations. Those more generally used for this purpose are triallyl cyanurate, ethylene glycol dimethacrylate, and divinyl benzene. Their use makes it possible to eliminate the disadvantageous properties of sulphur referred to above, but the results are far from being equivalent to those obtained with sulphur. In particular, these coagents do not make it possible to attain the high ultimate tensile strengths possessed by sulphur vulcanizates. The difference observed in the behavior of products cross-linked with their aid, when placed under mechanical tension, as compared with sulphur vulcanizates, is most probably due to the fact that all polyunsaturated compounds known up to the present time as cross-linking coagents do no more than produce stable cross-links between the copolymer chains without these links being capable of being broken and rearranged.

An increase of the quantity of organic peroxide added likewise does not make it possible to dispense with sulphur or to overcome the deficiencies of other cross-linking coagents. In this case, indeed, a very stiff product is obtained, the ultimate tensile strength of which is equal at most to only about three-quarters of that which it is possible to attain with sulphur.

SUMMARY OF THE INVENTION

A method has now been found which makes it possible to manufacture, from amorphous polymers and copolymers of olefins, cross-linked products the properties of which are close to those obtained by using sulphur as cross-linking coagent but which do not exhibit the usual disadvantages of products cross-linked by means of that coagent.

The invention comprises a method consisting in cross-linking an amorphous polymer or copolymer of α-olefins, particularly an ethylene-propylene copolymer, by heating at high temperature a composition containing the amorphous polymer or copolymer, from 0.1 to 20 parts, per 100 parts of the polymer or copolymer, of a cross-linking agent constituted of a compound able to form free radicals at the temperature to which the composition is brought, and from 0.1 to 20 parts, per 100 parts of the polymer or copolymer, of dibenzalacetone or one of its substitution derivatives.

It is surprising to note that whereas there was no reason to assume that dibenzalacetones would behave differently from other compounds having a plurality of unsaturations, they impart to a cross-linked product a very high ultimate tensile strength, which in certain cases may be as high as that attained by using sulphur. In addition, products cross-linked by the method of the invention have elasticity and elongations at break which are higher than those obtained with sulphur.

It is possible that the dibenzalacetones have the unexpected property of forming, like sulphur, liable cross-links which are capable of rearrangement when placed under load. In addition, their utilization entails none of the disadvantages inherent in the use of sulphur.

They impart no disagreeable odor to the cross-linked product and have no undesirable action on metals.

DESCRIPTION OF THE PREFERRED EMBODIMENTS

While all amorphous elastomeric polymers and copolymers of α-olefins can be treated by the method of the present invention, the invention is particularly applicable to the cross-linking of ethylene and propylene copolymers containing from 25 to 75 mol percent of propylene in the polymerized state.

In general, all compounds capable of liberating free radicals at the working temperature may be used as cross-linking agents in the method of the present invention. Peroxidized organic compounds (i.e. organic peroxides) are very suitable. Particular mention may be made of: dicumyl peroxide; 2,5-di(tert-butylperoxy)-2,5-dimethylhexyne-3; $\alpha,\alpha'$-di(tert-butylperoxy) - p - diisopropylbenzene; and the like. These peroxidized compounds are added to the polymer in a proportion of between 0.1 and 10 parts of peroxidized compound per 100 parts of the polymer.

Dibenzalacetone, also known as 1,5-diphenyl-1,4-pentadiene-3-one, is used in the proportion of 0.1 to 20 parts per 100 parts of the polymer. It is easily prepared by reacting, dissolved in water and ethyl alcohol, two mols of benzaldehyde and one mol of acetone (Organ. Synth., vol. 2, p. 166–1943).

In addition to dibenzalacetone, the substitution derivatives of dizenzalacetone, particularly 3,3'-dimethyl-dibenzalacetone and 2,2'-dichlorodibenzalacetone, are also suitable for the purposes of the present invention.

The abiilty to promote the cross-linking of amorphous elastomeric polymers and copolymers is not the only remarkable property of dibenzalacetones. They also have an insecticidal and fungicidal action capable of protecting the vulcanizates. In addition, their presence in the cross-linked products can contribute towards stabilizing them to ultraviolet rays.

composiiton are effected by the known technique, and in particular it is possible to operate with a conventional malaxation apparatus. The mixture is then transferred to molds and subjected to a heated press. The temperature must be sufficiently high to effect the formation of free radicals. In the process of the invention, this temperature is higher than 130° C. and is preferably between 150 and 220° C.

The cross-linking time (i.e., time over which the elevated temperature is maintained) is individually determined for each case. In general, it is between 30 seconds and two hours.

The following examples are intended to illustrate the invention without in any way limiting its scope.

EXAMPLE 1

Mixtures are formed which are composed of 100 parts of an ethylene-propylene copolymer the propylene content of which is 47 mol percent and the intrinsic viscosity of which is 0.25 liter/gram, 50 parts of HAF carbon black, a peroxidized organic compound, and, optionally, a cross-linking coagent. The temperature employed is 165° C. The identity and the concentration of the peroxidized compound and of the coagent, and also the cross-linking time are indicated in Table I. Plates produced from these mixtures are then subjected to a traction test, the results of which are likewise given in Table I. Tests made by way of comparison are designated by the letter R followed by their serial number.

TABLE I

| Test No. | Identity of peroxide | Peroxide content, parts | Identity of coagent | Coagent content, parts | Time, min. | 100% modulus, kg./cm.² | 300% modulus, kg./cm.² | Ultimate tensile strength, kg./cm.² | Elongated at break percent |
|---|---|---|---|---|---|---|---|---|---|
| R1 | Dicup 40C [1] | 5 | | 0 | 60 | 13 | 36 | 77 | 632 |
| R2 | do.[1] | 5 | Sulphur | 0.30 | 60 | 16 | 80 | 214 | 603 |
| R3 | Peroxymon F40 [2] | 5.23 | | 0 | 60 | 12 | 61 | 122 | 510 |
| R4 | do.[2] | 5.23 | Sulphur | 0.30 | 50 | 19 | 124 | 219 | 447 |
| R5 | Cab-9-Cure 2P [3] | 4.24 | | 0 | 50 | 14 | 69 | 117 | 440 |
| R6 | do.[3] | 4.24 | Sulphur | 0.30 | 60 | 20 | 118 | 220 | 455 |
| R7 | Dicup 40C [1] | 5 | Triallyl cyanurate | 1 | 60 | 17 | 90 | 151 | 445 |
| R8 | do.[1] | 5 | Divinylbenzene | 1 | 60 | 16 | 78 | 156 | 492 |
| R9 | do.[1] | 5 | Ethyleneglycol dimethacrylate | 1 | 50 | 13 | 71 | 153 | 498 |
| R10 | do.[1] | 5 | | 0 | 60 | 13 | 36 | 77 | 632 |
| R11 | do.[1] | 6 | | 0 | 60 | 13 | 47 | 98 | 563 |
| R12 | do.[1] | 10 | | 0 | 60 | 18 | 92 | 151 | 420 |
| R13 | do.[1] | 15 | | 0 | 60 | 21 | | 163 | 307 |
| 1 | do.[1] | 5 | Dibenzalacetone | 1 | 40 | 12 | 46 | 134 | 630 |
| 2 | do.[1] | 5 | do | 3 | 40 | 13 | 51 | 174 | 695 |
| 3 | do.[1] | 5 | do | 5 | 30 | 14 | 48 | 176 | 745 |
| 4 | do.[1] | 5 | do | 7.5 | 30 | 12 | 41 | 170 | 780 |
| 5 | do.[1] | 5 | do | 10 | 30 | 12 | 35 | 166 | 828 |
| 6 | Peroxymon F40 [2] | 5.23 | do | 3 | 40 | 16 | 94 | 187 | 505 |
| 7 | do.[2] | 5.32 | do | 5 | 40 | 13 | 79 | 195 | 552 |
| 8 | Cab-o-Cure 2P [3] | 4.24 | do | 5 | 80 | 15 | 90 | 194 | 500 |

[1] Dicumyl peroxide containing 40% of active material.
[2] $\alpha,\alpha'$di(tert.butylperoxy)p.diisopropylbenzene containing 40% of active material.
[3] 2,5-di(tert.butylperoxy)2,5-dimethylhexyne-3, containing 50% of active material.

Reinforcing materials constituted of finely divided mineral fillers may also be added to the elastomers which are subjected to the hardening by cross-linking treatment of the invention. The materials preferably used are carbon black, silica, alumina, calcium carbonate, kaolin, and the like, in various forms.

The results attained with silica are particularly remarkable. In this case, indeed, the elongation moduli at 100 and 300% and the elongations at break are higher than those recorded when sulphuh is used, while the ultimate tensile strength is only slightly lower. In addition, whereas by means of sulphur it is impossible to cross-link compositions filled with kaolin, the use of dibenzalacetones enables these compositions to be hardened to an appreciable extent. Finally, it is possible to impart to the cross-linked products mechanical properties intermediate between those obtained with dibenzalacetones used alone and those obtained with sulphur used alone. In order to do this it is sufficient to add to the mixture a small amount of sulphur, for example from 0.1 to 0.3 part per 100 parts of the polymer.

The mixing and the kneading of the ingredients of the

Comparison of the values shown in Table I makes it possible to appreciate the effect of sulphur as cross-linking coagent. Its incorporation slightly raises the 100% elongation modulus and very considerably raises the 300% elongation modulus and ultimate tensile strength. Elongation at break is slightly modified in various ways.

The reference tests also show that, whatever the nature and concentration of the peroxidized compound and of the conventional polyunsaturated cross-linking coagent which may be added, the cross-linked products obtained have mechanical properties markedly poorer than those of the products obtained with sulphur.

On the other hand, the cross-linked products obtained from mixtures containing dibenzalacetone have very desirable mechanical characteristics. They have very good elasticity, as evidenced by the moderate but nevertheless adequate values of the 100% and 300% elongation moduli and the very high elongation at break values. It is surprising to note that this elasticity is not obtained at the cost of ultimate tensile sterngth. The latter is very markedly higher than the values that can be obtained by using conventional polyunsaturated coagents; it is very close to that which sulphur makes it possible to achieve.

From these tests it is concluded that cross-linking with dibenzalacetone imparts very advantageous mechanical properties to the resultant cross-linked products. Dibenzalacetone can therefore advantageously replace sulphur in the majority of applications of cross-linked polymers, particularly in those in which the disadvantages of sulphur are particularly inconvenient.

very advantageous mechanical properties which are close to those obtained with dibenzalacetone. The substituted dibenzalacetones, like benzalacetone itself, may therefore advantageously replace sulphur in the majority of applications of cross-linked copolymers, particularly in those where the disadvantages of sulphur, namely odor and corrosiveness, are particularly inconvenient.

TABLE III

| Identity of coagent | Coagent content, parts | Cross-linking time, min. | 100% modulus, kg./cm.² | 300% modulus, kg./cm.² | Ultimate tensile strength, kg./cm.² | Elongation at break, percent |
| --- | --- | --- | --- | --- | --- | --- |
| Test No.: | | | | | | |
| 13 ............ 3,3'-dimethyldibenzalacetone .......... | 1 | 20 | 15 | 49 | 135 | 580 |
| 14 ................ do ................................. | 3 | 20 | 15 | 60 | 154 | 570 |
| 15 ................ do ................................. | 5 | 20 | 16 | 68 | 180 | 623 |
| 16 ................ do ................................. | 9 | 20 | 16 | 50 | 172 | 722 |
| 17 ............ 2,2'-dichlorodibenzalacetone .......... | 1 | 40 | 13 | 54 | 128 | 542 |
| 18 ................ do ................................. | 3 | 40 | 15 | 64 | 167 | 555 |
| 19 ................ do ................................. | 5 | 40 | 15 | 62 | 166 | 552 |

EXAMPLE 2

Mixtures are made which contain white fillers instead of carbon black as reinforcing material. The compositions of this series of tests contain 100 parts of an ethylene-propylene copolymer identical to that used in Example 1, 60 parts of filler material (Ultrasil VN3 hydrated silica or Spestone hard kaolin), 5.23 parts of α,α'-di(tert.-butylperoxy)-p.-diisopropylbenzene (Peroxymon F 40), dibenzalacetone and sulphur. The temperature employed is 165° C. The identity of the filler and also the concentrations of dibenzalacetone and sulphur are indicated in Table II, in which the cross-linking time applied to these mixtures is also shown. The plates produced in this manner are subjected to traction tests. Their mechanical characteristics are given in Table II. Those tests which were made by way of comparison have the letter R before their serial number.

TABLE II

| Identity of filler | Dibenzal-acetone, parts | Sulphur, parts | Time, min. | 100% modulus, kg./cm.² | 300% modulus, kg./cm.² | Ultimate tensile strength, kg./cm.² | Elongation at break, percent |
| --- | --- | --- | --- | --- | --- | --- | --- |
| Test No.: | | | | | | | |
| R14 ...... Silica ..... | 0 | 0 | 60 | 20 | 22 | 124 | 985 |
| R15 ............ do ..... | 0 | 0.3 | 40 | 20 | 34 | 207 | 887 |
| 9 ............... do ..... | 5 | 0 | 40 | 28 | 36 | 178 | 888 |
| 10 .............. do ..... | 4.7 | 0.3 | 40 | 25 | 28 | 184 | 925 |
| R16 ...... Kaolin ..... | 0 | 0 | 60 | No vulcanization, plates torn or blistered | | | |
| R17 ............ do ..... | 0 | 0.3 | 60 | | | | |
| 11 .............. do ..... | 5 | 0 | 60 | 11 | 16 | 36 | 1,400 |
| 12 .............. do ..... | 4.7 | 0.3 | 40 | 9 | 12 | 38 | 1,550 |

These tests show that in the presence of hydrated silica serving as reinforcement, the properties achieved with dibenzalacetone are almost equivalent to those obtained with sulphur, while the cross-linked product nevertheless does not have the disadvantages inherent in the use of the latter. Moreover, the utilization of dibenzalacetone as cross-linking agent makes it possible to harden to an appreciable degree the ethylene-propylene copolymer filled with koalin, whereas it is impossible to do this with sulphur.

When it is desired to obtain greater elasticity under great deformation, dibenzalacetone may be used together with sulphur.

EXAMPLE 3

Mixtures are made which are composed of 100 parts of an ethylene-propylene copolymer the propylene content of which is 47 mol percent and the intrinsic viscosity of which is 0.25 liter/gram, 50 parts of HAF carbon black, 5 parts of dicumyl peroxide containing 40% of active material, and a substituted dibenzalacetone. The temperature employed is 165° C. The identity and concentration of the coagent used and also the cross-linking time are indicated in Table III below.

The plates produced from these mixtures are then subjected to a traction test, the results of which are likewise shown in Table III below.

From these tests it is concluded that the substituted dibenzalacetones likewise impart to the cross-linked products Particular embodiments of the invention have been referred to herein to illustrate the invention but not to limit the scope thereof. The scope of the invention is to be determined by reference to the appended claims.

What we claim and desire to secure by Letters Patent is:

1. A method of cross-linking a polymer of the group consisting of amorphous polymers and copolymers of α-olefins, comprising heating to a temperature higher than 130° C. a mixture comprising the polymer, a compound capable of forming free radicals at said temperature, and a dibenzalacetone compound of the group consisting of dibenzalacetone and substitution derivatives thereof.

2. A method according to claim 1, in which the mixture also comprises a mineral reinforcing material.

3. A method according to claim 2, in which the quantity of the reinforcing material in the mixture is from 10 to 100 parts per 100 parts of the polymer.

4. A method according to claim 3, in which the reinforcing material is of the group consisting of carbon black, silica, alumina, calcium carbonate and kaolin.

5. A method according to claim 1, in which the mixture further comprises sulphur.

6. A method according to claim 5, in which the quantity of the sulphur in the mixture is 0.1 to 0.3 part per 100 parts of the polymer.

7. A method according to claim 1, in which the compound capable of forming free radicals is an organic peroxide.

8. A method according to claim 1, in which the compound capable of forming free radicals at the working temperature is of the group consisting of dicumylperoxide, α,α'-di(tert.-butylperoxy)-p.-diisopropylbenzene and 2,5-di(tert.-butylperoxy)-2,5-dimethylhexyne-3.

9. A method according to claim 1, in which the substituted dibenzalacetone is of the group consisting of 3,3-dimethyldibenzalacetone and 2,2' - dichlorodibenzalacetone.

10. A method according to claim 1, in which the quantity of the dibenzalacetone compound in the mixture is between 0.1 and 20 parts per 100 parts of the polymer.

11. A method according to claim 10, in which the quantity of the dibenzalacetone compound in the mixture is between 1 and 10 parts per 100 parts of the polymer.

12. A method according to claim 1, in which the quantity of the compound capable of forming free radicals is between 0.1 and 10 parts per 100 parts of the polymer.

13. A method according to claim 1, in which the temperature to which the mixture is heated is between 150 and 220° C.

14. A method according to claim 1, in which the polymer is an ethylene-propylene copolymer the proportion of propylene in which is 25 to 75 mol percent.

15. A method according to claim 10 in which the quantity of dibenzalacetone compound in the mixture is at least about 3 parts per 100 parts of the polymer.

16. A polymeric composition cross-linkable by heating at a high temperature, said composition comprising prior to said heating a polymer of the group consisting of amphorous polymers and copolymers of α-olefins, a compound capable of forming free radical at said temperature and dibenzalacetone compound of the group consisting of dibenzalacetone and substitution derivatives thereof.

17. A cross-linkable polymeric composition according to claim 16 in which the mixture contains a reinforcing material in an amount of from 10 to 100 parts per 100 parts of said polymer, said reinforcing material being selected from the group consisting of carbon black, silica, alumina, calcium, calcium carbonate and kaolin.

18. A cross-linkable polymeric composition according to claim 16 in which the quantity of said dibenzalacetone compound is about 1 to 10 parts per 100 parts of polymer.

19. A cross-linkable polymeric composition according to claim 18 in which the quantity of said dibenzalacetone is at least 3 parts per 100 parts of said polymer and in which said cross-linked composition has a tensile strength of at least about 145 kg./cm.$^2$ and an elongation at break of about 502% or higher.

20. A cross-linkable polymeric composition according to claim 18 having a tensile strength from about 134 to 195 kg./cm. and an elongation at break of about 502% to about 825%.

21. A cross-linkable polymeric composition according to claim 16 in which the mixture further comprises sulfur in an amount of about 0.1 to 0.3 part per 100 parts of the polymer.

22. A cross-linkable polymeric composition according to claim 16 in which said polymer is an ethylene-propylene copolymer the proportion of propylene in which is 25 to 75 mol percent, said compound capable of forming free radicals is an organic peroxide selected from the group consisting of dicumylperoxide, α,α'-di(tert.-butylperoxy) - p.-diisopropylbenzene and 2,5 - di(tert. - butylperoxy)-2,5-dimethylhexyne-3 and said dibenzalacetone compound is selected from the group which consists of dibenzalacetone, 3,3-dimethyldibenzalacetone and 2,2' - dichlorodibenzalacetone.

References Cited

UNITED STATES PATENTS 2,484,529  10/1949  Roedel _____ 204—158
3,227,698   1/1966  Robinson.

OTHER REFERENCES

Lenas, L. P., Evaluation of Cross-linking Coagents in Ethylene-Propylene Rubber, in I&EC Product Research and Development, vol. 2, No. 3, September 1963, pp. 202–208.

MORRIS LIEBMAN, Primary Examiner

J. H. DERRINGTON, Assistant Examiner

U.S. Cl. X.R.

260—88.2, 93.7, 94.9